US012695372B2

(12) United States Patent (10) Patent No.: US 12,695,372 B2
Ikuyama et al. (45) Date of Patent: Jul. 28, 2026

(54) GATE DRIVE CIRCUIT AND POWER CONVERSION DEVICE

(71) Applicant: HITACHI ASTEMO, LTD., Hitachinaka (JP)

(72) Inventors: Takeshi Ikuyama, Hitachinaka (JP); Koichi Yahata, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 204 days.

(21) Appl. No.: 18/726,611

(22) PCT Filed: Feb. 7, 2022

(86) PCT No.: PCT/JP2022/004770
§ 371 (c)(1),
(2) Date: Jul. 3, 2024

(87) PCT Pub. No.: WO2023/148988
PCT Pub. Date: Aug. 10, 2023

(65) Prior Publication Data
US 2025/0079971 A1 Mar. 6, 2025

(51) Int. Cl.
H02M 1/08 (2006.01)
H02M 1/084 (2006.01)
(Continued)

(52) U.S. Cl.
CPC ............. H02M 1/084 (2013.01); H02M 1/08 (2013.01); H02M 1/088 (2013.01); H02M 1/32 (2013.01);
(Continued)

(58) Field of Classification Search
CPC .... H02M 1/0012; H02M 1/0054; H02M 1/08; H02M 1/084; H02M 1/088; H02M 1/32;
(Continued)

(56) References Cited

U.S. PATENT DOCUMENTS 10,468,966 B1 * 11/2019 Mourrier ................ H03K 17/08
2017/0012551 A1 * 1/2017 Kondo ................. H03K 17/691
(Continued)

FOREIGN PATENT DOCUMENTS

EP 1619782 A2 1/2006
JP H08-298786 A 11/1996
(Continued)

OTHER PUBLICATIONS

International Search Report with English Translation in corresponding International Application No. PCT/JP2022/004770, dated Apr. 19, 2022.

*Primary Examiner* — Thienvu V Tran
*Assistant Examiner* — Shahzeb K Ahmad
(74) *Attorney, Agent, or Firm* — Foley & Lardner LLP

(57) ABSTRACT

In a gate drive circuit, a first and second gate drives IC includes an INA terminal and an INB terminal to which a PWM signal is input, a gate output terminal that outputs a gate drive signal, and an OSFB terminal that outputs a feedback signal of the gate drive signal, and they are configured to output a gate drive signal in an ON state when the input of the INA terminal and the INB terminal is (ON, OFF). In the first gate drive IC, a first PWM signal is input to the INA terminal, and a second PWM signal is input to the INB terminal, and in the second gate drive IC, the second PWM signal is input to the INA terminal, and the first PWM signal is input to the INB terminal. The first diode includes a cathode side connected to the INB terminal of the second gate drive IC and an anode side connected to the OSFB terminal of the first gate drive IC. The second diode includes a cathode side connected to the INB terminal of the first gate drive IC and an anode side connected to the OSFB terminal of the second gate drive IC.

7 Claims, 13 Drawing Sheets

(51) Int. Cl.

| | | |
|---|---|---|
| *H02M 1/088* | (2006.01) | |
| *H02M 1/32* | (2007.01) | |
| *H02M 1/38* | (2007.01) | |
| *H02M 7/538* | (2007.01) | |
| *H02M 7/5387* | (2007.01) | |
| *H02M 7/5395* | (2006.01) | |

(52) U.S. Cl.
   CPC ........... *H02M 1/38* (2013.01); *H02M 7/5387*
           (2013.01); *H02M 7/5395* (2013.01)

(58) Field of Classification Search
   CPC ............ H02M 1/36; H02M 1/38; H02M 7/44;
           H02M 7/48; H02M 7/483; H02M 7/487;
              H02M 7/53; H02M 7/538; H02M
       7/53846; H02M 7/5387; H02M 7/5395;
              H02M 7/66; H02M 7/757; H03K
                 17/08122; H03K 2217/0036
   See application file for complete search history.

(56)                References Cited

U.S. PATENT DOCUMENTS

2019/0363708 A1 * 11/2019 Yamauchi ............... H02M 7/48
2022/0416664 A1 * 12/2022 Wu ........................ H02M 1/36

FOREIGN PATENT DOCUMENTS

| JP | 2006-034077 A | | 2/2006 | |
|---|---|---|---|---|
| JP | 2009296732 A | * | 12/2009 | |
| JP | 4442348 B2 | | 3/2010 | |
| WO | WO-2022259780 A1 | * | 12/2022 | .......... H02M 7/5387 |

\* cited by examiner (LOGICAL SYMBOL)

INA
INB
GATE (LOGICAL TABLE)

|  | INA:High | INA:Low |
|---|---|---|
| INB:High | Gate Low (OFF) | Gate Low (OFF) |
| INB:Low | Gate High (ON) | Gate Low (OFF) |

GATE DRIVE CIRCUIT AND POWER CONVERSION DEVICE

TECHNICAL FIELD

The present invention relates to a gate drive circuit and a power conversion device.

BACKGROUND ART

An inverter that drives a three-phase AC motor usually includes six switching elements of three-phase upper and lower arms, and a gate driver circuit for driving each switching element is also provided for six arms. A motor-driven three-phase alternating current is generated by controlling ON/OFF of the switching elements of the upper and lower arms with a gate drive signal of the gate driver circuit. At this time, providing a dead time in which the switching elements of the upper and lower arms are turned off prevents a vertical short circuit in which the upper and lower arms are simultaneously turned on or one arm is turned on during a gate OFF transition of the other arm. As a dead time securing method, a method using software and a method using hardware are typically known.

CITATION LIST

Patent Literature

PTL 1: JP 4442348 B

SUMMARY OF INVENTION

Technical Problem

However, when a dead time is secured by software, there is a case where a lack of the dead time temporarily occurs due to a software operation failure or the like. When a dead time is secured by hardware, a large-scale circuit is required, which is disadvantageous in terms of cost and a mounting area as compared with a case of using software. Further, since the OFF transition time varies depending on the amount of current flowing through the switching element, there is also a problem that optimization is difficult.

Solution to Problem

A gate drive circuit according to an aspect of the present invention includes a first gate drive IC that drives a gate of a first switching element of an upper arm, a second gate drive IC that drives a gate of a second switching element of a lower arm connected in series to the first switching element, first, second, third, and fourth resistance elements, and first and second diodes, wherein each of the first and second gate drives IC includes an INA terminal and an INB terminal to which a PWM signal is input, a gate output terminal that outputs a gate drive signal, and an OSFB terminal that outputs a feedback signal of the gate drive signal, each of the first and second gate drives IC is configured to output a gate drive signal in an ON state when the PWM signal of the INA terminal is ON and the PWM signal of the INB terminal is OFF, in the first gate drive IC, as the PWM signal, a first PWM signal for the first switching element is input to the INA terminal via the first resistance element, and a second PWM signal for the second switching element is input to the INB terminal via the second resistance element, in the second gate drive IC, as the PWM signal, the second PWM signal is input to the INA terminal via the third resistance element, and the first PWM signal is input to the INB terminal via the fourth resistance element, the first diode includes a cathode side connected to the INB terminal of the second gate drive IC and an anode side connected to the OSFB terminal of the first gate drive IC, and the second diode includes a cathode side connected to the INB terminal of the first gate drive IC and an anode side connected to the OSFB terminal of the second gate drive IC.

Advantageous Effects of Invention

According to the present invention, it is possible to prevent a vertical short circuit due to insufficient dead time.

BRIEF DESCRIPTION OF DRAWINGS

FIG. 3 is a diagram illustrating an example of a conventional timing chart from when a gate of an upper arm is turned off to when a gate of a lower arm is turned on.

FIG. 5 is a timing chart according to the present embodiment.

FIG. 6 is a diagram for describing synchronous rectification control.

FIG. 7 is a timing chart in a case where synchronous rectification control is performed.

DESCRIPTION OF EMBODIMENTS

Figure 1:
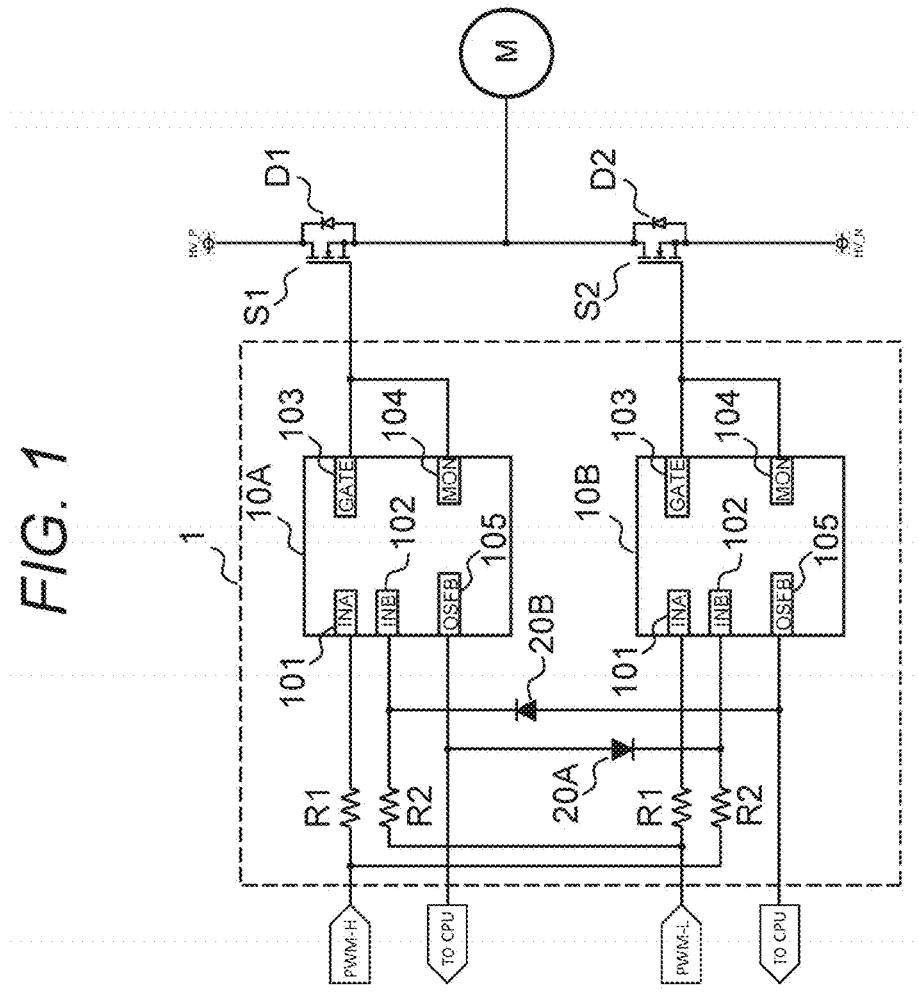
FIG. 1 is a diagram illustrating an example of a gate drive circuit according to an embodiment.

Hereinafter, embodiments of a semiconductor device according to the present invention will be described with reference to the drawings. The following description and drawings are examples for describing the present invention, and they are omitted and simplified as appropriate for the sake of clarity of description. In the following description, the same or similar elements and processes are denoted by the same reference numerals, and redundant description may be omitted. The contents described below are merely examples of embodiments of the present invention, and the present invention is not limited to the following embodiments, and it can be implemented in other various forms.

Figure 13:
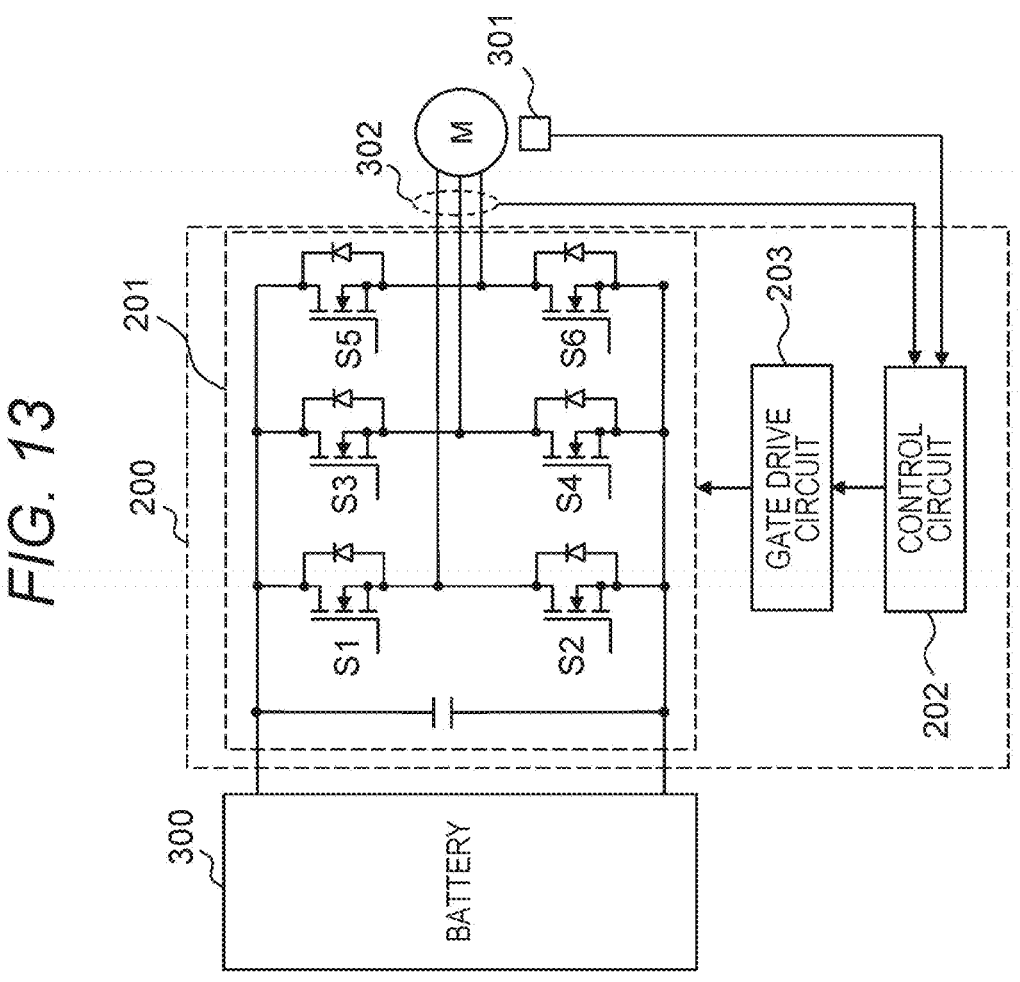
FIG. 13 is a diagram illustrating an example of a power conversion device that supplies a three-phase alternating current.

FIG. 1 is a diagram illustrating an example of a gate drive circuit 1 according to the present embodiment. For example, as illustrated in FIG. 13, a power conversion device 200 that supplies a three-phase alternating current to a three-phase alternating-current motor M includes an inverter 201 having six switching elements S1 to S6 constituting phase upper and lower arms. FIG. 1 illustrates a gate drive circuit of the switching elements S1 and S2 constituting upper and lower arms for one phase in the inverter 201 of FIG. 13.

The power conversion device 200 includes the inverter 201, a control circuit 202, and a gate drive circuit 203. The control circuit 202 includes a CPU and generates a PWM signal for supplying a three-phase alternating current based on the magnetic pole position of a rotor of the motor M detected by a magnetic pole position sensor 301 and a motor current value detected by a current sensor 302. The PWM signal generated by the control circuit 202 is input to the gate drive circuit 203 provided with a gate drive IC. The gate drive circuit 203 is provided with six gate drives IC corresponding to the six switching elements S1 to S6. The gate drive circuit 203 generates a gate drive signal for driving each of the switching elements S1 to S6 of the inverter 201 based on the PWM signal, and outputs the gate drive signal to each of the switching elements S1 to S6. As a result, the direct-current power from a high-voltage battery 300 is converted into alternating-current power and supplied to the motor M.

FIG. 1 illustrates the switching elements S1 and S2 constituting upper and lower arms for one phase, and a portion corresponding to the switching elements S1 and S2 in the gate drive circuit 203 of FIG. 13 is illustrated as the gate drive circuit 1. The gate drive circuit 1 includes two gate drives IC 10A and 10B, the gate of the switching element S1 is driven by the gate drive IC 10A, and the gate of the switching element S2 is driven by the gate drive IC 10B. As the switching elements S1 and S2, a power semiconductor element such as an insulated gate bipolar transistor (IGBT) or a metal oxide semiconductor field effect transistor (MOSFET) using SiC, GaN, or the like is used. Diodes D1 and D2 for reflux are connected in parallel to the switching elements S1 and S2 in a direction opposite to the energization direction at the time of switching on. In the case of the MOSFET, since a body diode (parasitic diode) is provided inside the element, the body diode is used as diodes D1 and D2 for reflux.

The gate drives IC 10A and 10B include an isolated communication circuit between a low-voltage circuit and a high-voltage circuit. The gate drive IC 10A on the upper arm side controls the gate of the switching element S1 on the high-voltage side according to the PWM signal (PWM-H signal) on the upper arm side input from the CPU on the low-voltage side. The gate drive IC 10B on the lower arm side controls the gate of the switching element S2 according to the PWM signal (PWM-L signal) on the lower arm side input from the CPU.

Figure 2:
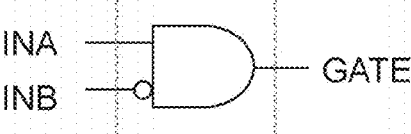
FIG. 2 is a diagram illustrating a logical symbol and a logical table of gate drive.

The gate drives IC 10A and 10B have the same configuration and include two types of input terminals for PWM signals. One is an INA terminal 101 that sets the gate voltage to High according to a High signal of the PWM signal and turns on the gate. The other is an INB terminal that turns on the gate according to a Low signal of the PWM signal. The PWM signal to be input, and the logical symbol and the logical table of the gate drive are as illustrated in FIG. 2.

The gate drives IC 10A and 10B include a gate output terminal (GATE terminal) 103 as an output terminal and a gate monitor terminal (MON terminal) 104. The gate output terminal 103 is an output terminal of a gate drive signal for controlling the gate voltage, and it can be one terminal, but usually, it may include two or more terminals for changing an ON speed and an OFF speed. The gate monitor terminal 104 is a terminal for monitoring the gate voltage, but it may also be used as the gate output terminal 103.

The CPU not illustrated outputs PWM signal (hereinafter, referred to as a PWM-H signal) for controlling the gate drive of the upper arm and a PWM signal (hereinafter, referred to as a PWM-L signal) for controlling the gate drive of the lower arm, and inputs the PWM signal to the INA terminal 101 of each of the gate drives IC 10A and 10B of the upper arm and the lower arm. The PWM-H signal is also input to the INB terminal 102 of the gate drive IC 10B of the lower arm, and the PWM-L signal is also input to the INB terminal 102 of the gate drive IC 10A of the upper arm. The PWM signal input to the INA terminal 101 of the paired gate drives IC is also input to the INB terminal 102 to prevent the switching elements S1 and S2 of the upper and lower arms from being turned on at the same time and causes a vertical short circuit.

The gate drives IC 10A and 10B include a gate state feedback terminal 105 (hereinafter, referred to as an OSFB terminal) that performs a feedback output of the gate state to the low voltage side. The OSFB terminal 105 outputs a High signal when the gate voltage exceeds a predetermined threshold value, and outputs a Low signal when the gate voltage falls below the predetermined threshold value.

In the present embodiment, as illustrated in FIG. 1, the output signal of the OSFB terminal 105 of the gate drive IC 10A of the upper arm is input to the INB terminal 102 of the gate drive IC 10B on the other arm side. In the same manner, the output signal of the OSFB terminal 105 of the gate drive IC 10B of the lower arm is input to the INB terminal 102 of the gate drive IC 10A on the other arm side. This makes it possible to suppress the gate drive on the other arm side in the middle of gate-off of the either arm, and it is possible to shorten the dead time while preventing a vertical short circuit.

The OSFB signal output from the OSFB terminal 105 becomes High when the gate voltage exceeds a predetermined threshold value, and conversely becomes Low when the gate voltage falls below the predetermined threshold value. Thus, High and Low of the PWM signal input to the INA terminal 101 and High and Low of the OSFB signal output from the OSFB terminal 105 are not instantaneously synchronized with each other. Thus, considering a situation in which the OSFB signal (hereinafter, referred to as an OSFB-L signal) of the gate drive IC 10B is Low and the PWM-L signal input to the INB terminal 102 of the gate drive IC 10A is High, Low of the OSFB-L signal inhibits the INB terminal 102 of the gate drive IC 10A from becoming High.

Thus, to eliminate the effect of preventing the vertical and simultaneous ON by the INB terminal 102, as illustrated in FIG. 1, the OSFB terminal 105 of the gate drive IC 10B and the INB terminal 102 of the gate drive IC 10A are connected via a diode 20B disposed such that the OSFB terminal side of the gate drive IC 10B becomes the anode. In the same manner, the OSFB terminal 105 of the gate drive IC 10A and the INB terminal 102 of the gate drive IC 10B are connected via a diode 20A disposed such that the OSFB terminal side of the gate drive IC 10A becomes the anode.

When a situation in which the OSFB-H signal is High and the PWM-H signal is Low is considered, the signals compete between High and Low, and the INA terminal 101 of the gate drive IC 10A does not become Low. To avoid such a conflict, a resistor R1 is disposed on the PWM signal input line of the INA terminal 101 of each of the gate drives IC 10A and 10B, and a resistor R2 is disposed on the PWM signal input line of the INB terminal 102 of each of the gate drives IC 10A and 10B.

Figure 3:
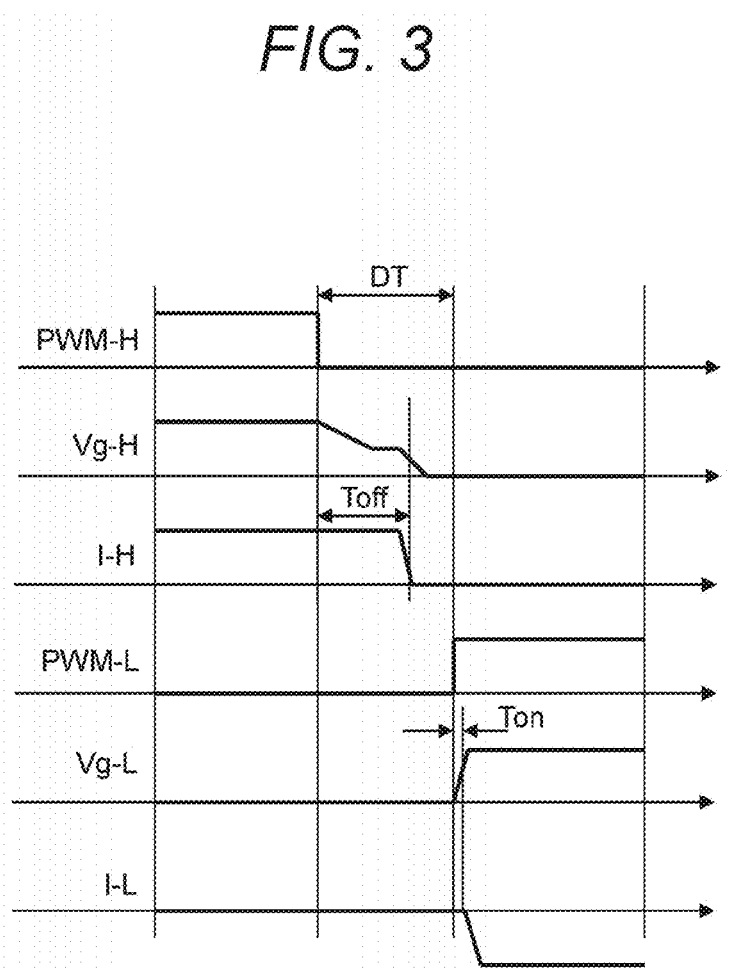

FIG. 3 illustrates an example of a timing chart from the gate OFF of the upper arm to the gate ON of the lower arm in a case of a conventional configuration, that is, a configuration where the OSFB signal is not input to the INB terminal 102 of the other arm or the resistors R1 and R2 are not provided unlike the present embodiment. A dead time DT is provided to prevent a vertical short circuit. The dead time DT indicates a time during which neither the PWM-H signal nor the PWM-L signal input to the INA terminals 101 of the upper and lower arms becomes High. FIG. 3 illustrates a scene in which the PWM-H signal is switched from High to Low and the PWM-L signal is switched from Low to High.

When the PWM-H signal is switched from High to Low, a gate voltage Vg-H of the switching element S1 of the upper arm starts to decrease. Even though the gate voltage Vg-H starts to decrease, a current I-H flowing through the switching element S1 is maintained for a while, and when the gate voltage Vg-H decreases to a certain voltage, the current I-H becomes 0. The time from the start of the decrease of the gate voltage Vg-H until the current I-H reaches 0 is called a turn-off time (Toff).

When the PWM-H signal becomes Low and the dead time DT elapses, the PWM-L signal which is the PWM signal on the lower arm side becomes High. The time from when the PWM-L signal becomes High to when the current I-L of the switching element S2 of the lower arm starts flowing is referred to as a turn-on time (Ton). Vg-L is a gate voltage of the switching element S2 of the lower arm. Usually, a vertical short circuit is prevented by setting the dead time DT such that DT>(Ton+Toff). The dead time DT is usually set by software on the CPU side.

Figure 4:
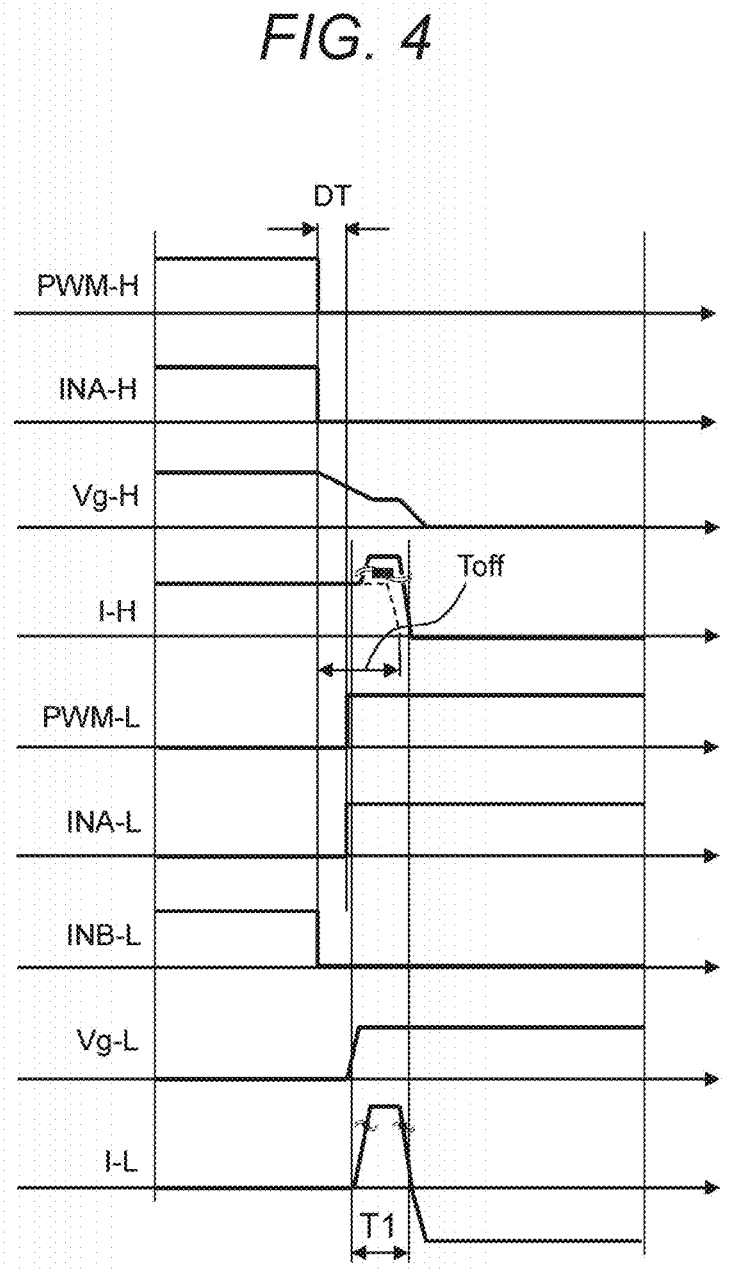
FIG. 4 is a diagram illustrating a timing chart in a case where a dead time DT is set shorter than Ton+Toff.

FIG. 4 is a diagram illustrating a timing chart in a case where the dead time DT is set shorter than Ton+Toff. In FIG. 4, an INA-H signal, an INA-L signal, and an INB-L signal are also illustrated. The INA-H signal and the INB-L signal have the same waveform as the PWM-H signal, and the INA-L signal has the same waveform as the PWM-L signal. When the PWM-H signal is switched from High to Low, the INB-L signal of the lower arm also becomes Low. Thereafter, when the PWM-L signal is switched from Low to High before the turn-off time Toff of the upper arm elapses, the INA-L signal of the lower arm also changes from Low to High. The INA-L terminal 101 and the INB-L terminal 102 become (High, Low), the GATE terminal 103 of the lower arm becomes High, and the gate voltage Vg-L increases. A vertical short circuit occurs in a period T1 when the dead time DT is shorter than Ton+Toff even though the gate drive IC includes the INB terminal 102 like this.

Figure 5:
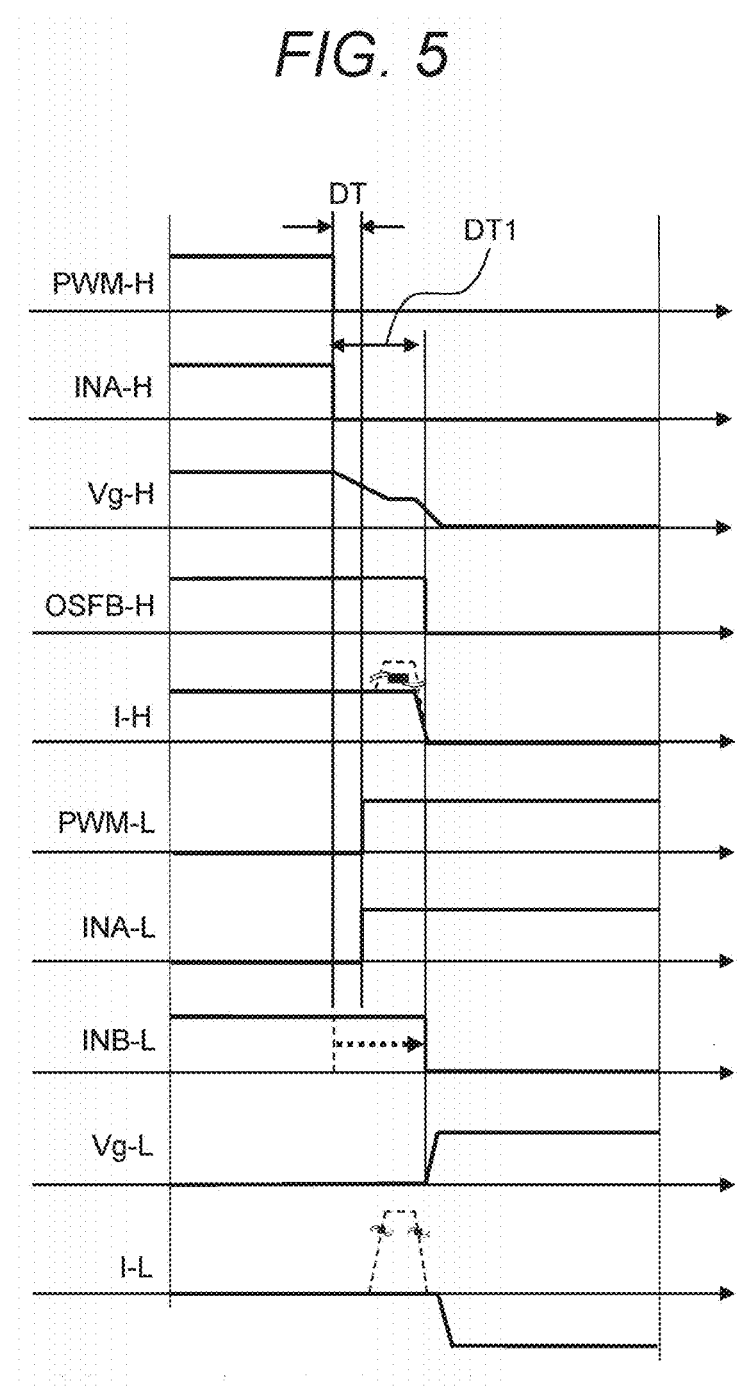

On the other hand, the configuration as illustrated in FIG. 1 makes it possible to prevent a vertical short circuit due to insufficient dead time. FIG. 5 is a diagram illustrating a timing chart in the present embodiment when the setting of the dead time DT with the PWM-H signal and the PWM-L signal is set to be the same as that in FIG. 4. In FIG. 5, the OSFB-H signal of the upper arm is also illustrated. When the PWM-H signal of the upper arm is switched from High to Low, the gate voltage Vg-H decreases. However, the OSFB-H signal is maintained at High while the gate voltage Vg-H exceeds a predetermined threshold value. When the gate voltage Vg-H falls below the predetermined threshold value, the OSFB-H signal changes from High to Low.

In the present embodiment, the output signal of the OSFB terminal 105 is input to the INB terminal 102 of the other arm, and thus the signal (INB-L signal) input to the INB terminal 102 of the lower arm is maintained at High even though the INA-H signal is switched to Low and the INA-L signal is switched to High. That is, while the OSFB-H signal is High, the INB-L signal is maintained High, and the gate drive of the lower arm does not start even when the INA-L signal is High. In this manner, in the present embodiment, a short circuit prevention period DT1 longer than the set dead time DT is secured, and a vertical short circuit can be prevented even when the set dead time DT is insufficient.

When the gate voltage Vg-H of the upper arm falls below the predetermined threshold value and the OSFB-H signal becomes Low, the INB-L signal also becomes Low and the gate drive operation of the lower arm starts. Then, the gate voltage Vg-L increases, and the switching element S2 of the lower arm is turned on. In this manner, in the present embodiment, since the short circuit prevention period DT1 is created in accordance with the gate state, the short circuit prevention period DT1 which is a substantial dead time is secured, and a vertical short circuit can be prevented, for example, even when the set dead time DT is DT=0.

Figure 6:
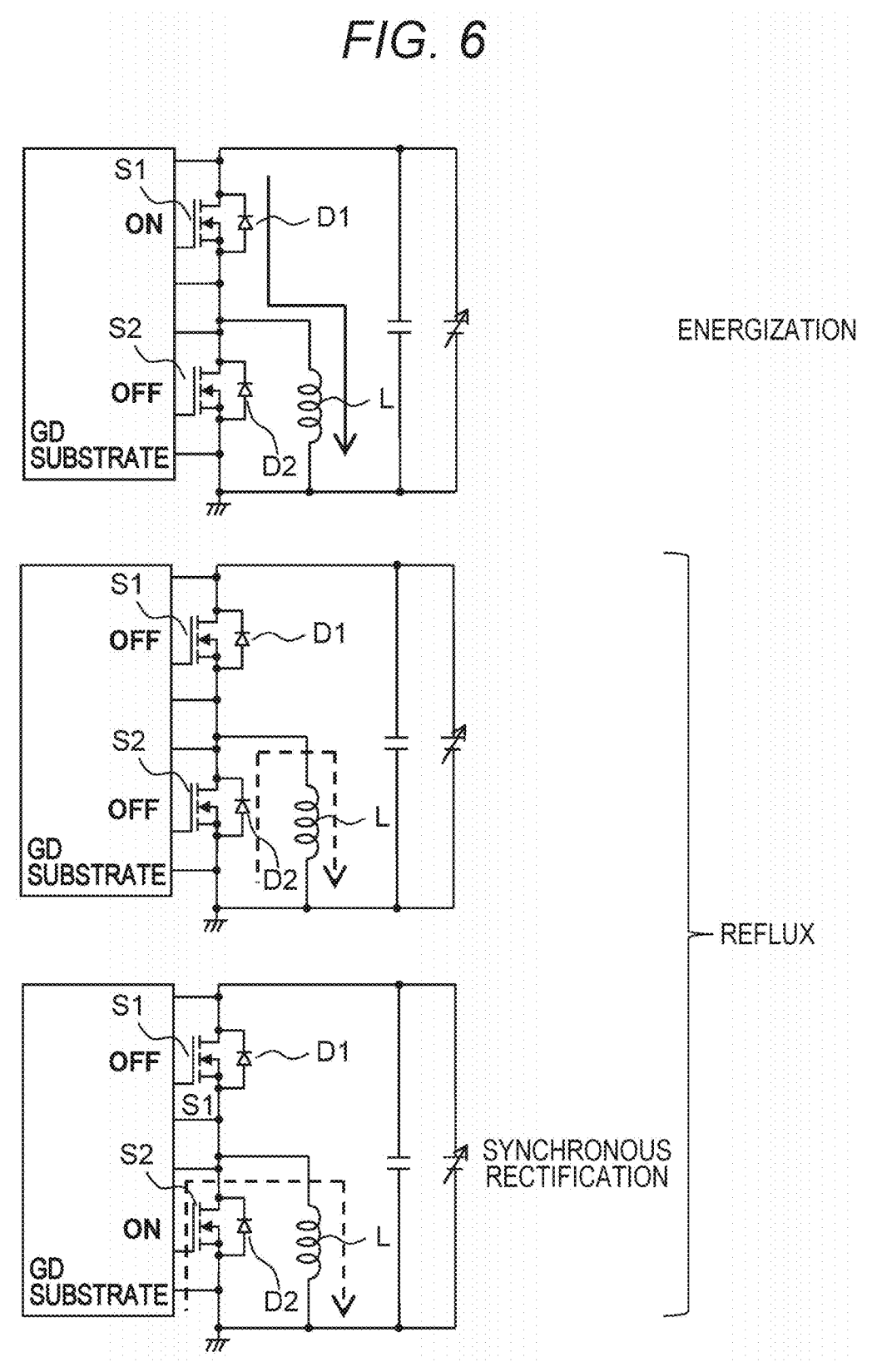

FIG. 6 is a diagram for describing synchronous rectification control, which is illustrated in a simplified manner for easy understanding of the description. When a current flows through an inductive load L such as a motor, the diodes D1 and D2 for reflux are provided so that the current continues to flow through the inductive load L. FIG. 6 illustrates a case where MOSFETs are used as the switching elements S1 and S2, and parasitic diodes of the elements function as the diodes D1 and D2. When the device is energized with the switching element S1 on the upper arm side being turned on and the switching element S2 on the lower arm side being turned off, a current flows in a direction indicated by the solid arrow.

When the switching element S1 on the upper arm side is turned off after a certain amount of current flows, reflux occurs via the diode D2 provided on the lower arm side. When the switching elements S1 and S2 are IGBTs, the diodes D1 and D2 are separately provided. On the other hand, in the case of the MOSFET, SiC, or GaN, the diodes D1 and D2 of the switching elements S1 and S2 are parasitic diodes, and a reflux current flows through the parasitic diodes. A MOSFET (including SiC), a GaN high electron mobility transistor (HEMT), and the like have reverse conductivity when a gate is turned on. Thus, when the switching element S2 is controlled to be ON during the reflux, the reflux current flows through the switching element S2 having a smaller loss than the diode D2. That is, performing synchronous rectification can perform the recirculation with low loss. On the other hand, in the case of the IGBT, since there is no reverse conductivity, the current flows through the diode D2 even when the switching element S2 is controlled to be ON during the reflux.

Figure 7:
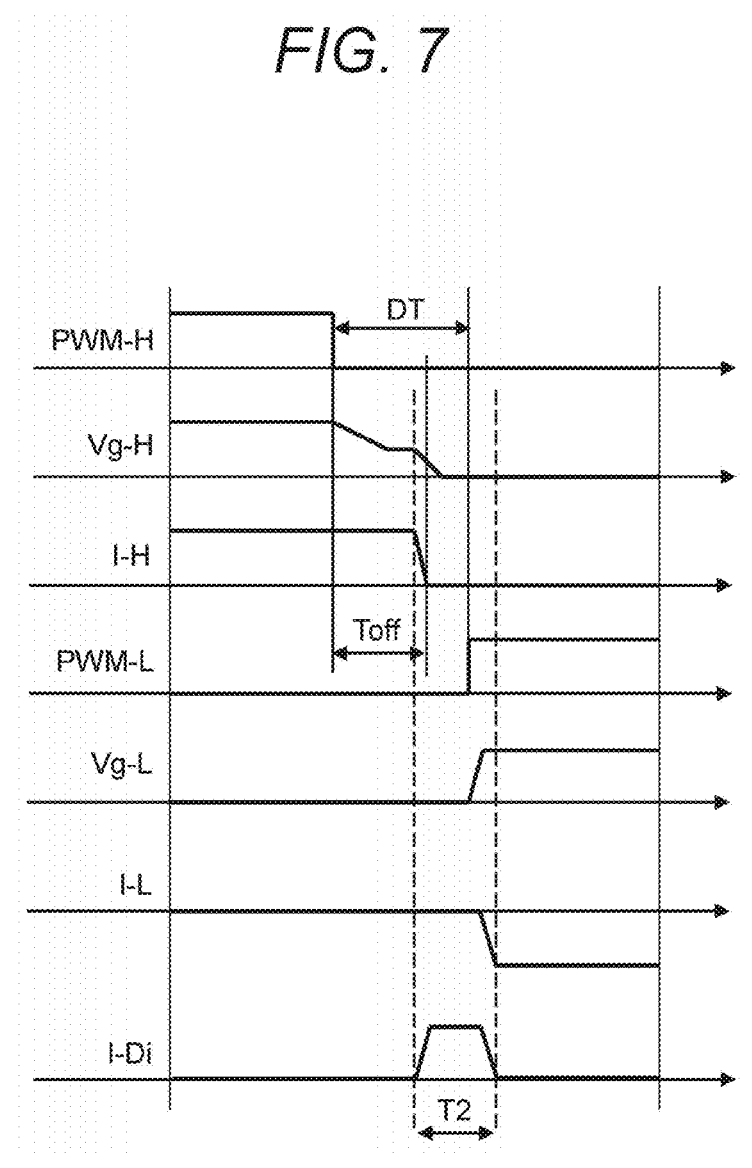

FIG. 7 is a timing chart in the case of synchronous rectification control, in which a current I-Di flowing through the diode D2 is added to the timing chart of FIG. 3. In the current I-L flowing through the FET, the drain-to-source direction is set to positive, and the forward direction of the diode D2 is set to positive. Conventionally, when synchronous rectification control is performed, a dead time DT is provided to prevent a vertical short circuit. The longer the dead time DT, the longer the time T2 during which the current I-Di flows during the reflux. The reflux loss due to the diode D2 is larger than the reflux loss due to FET conduction. Thus, to reduce the loss at the time of reflux, it is necessary to shorten the dead time DT and shorten the time T2 which is the loss period due to the diode D2.

Usually, the dead time DT is determined in consideration of the rise time of the gate voltage Vg and the fall time of the gate voltage Vg, but the time is typically fixed. As described with reference to FIG. 4, a vertical short circuit occurs when the dead time DT is too short, and thus, there is a limit to shortening the dead time DT. In addition, the fall time of the gate voltage Vg varies depending on the conducting current, and the smaller the current, the slower the gate falling tends to be. Thus, the dead time is usually set according to the case where the current is small, and thus, the reflux time during the dead time at the time of large current becomes long.

Figure 8:
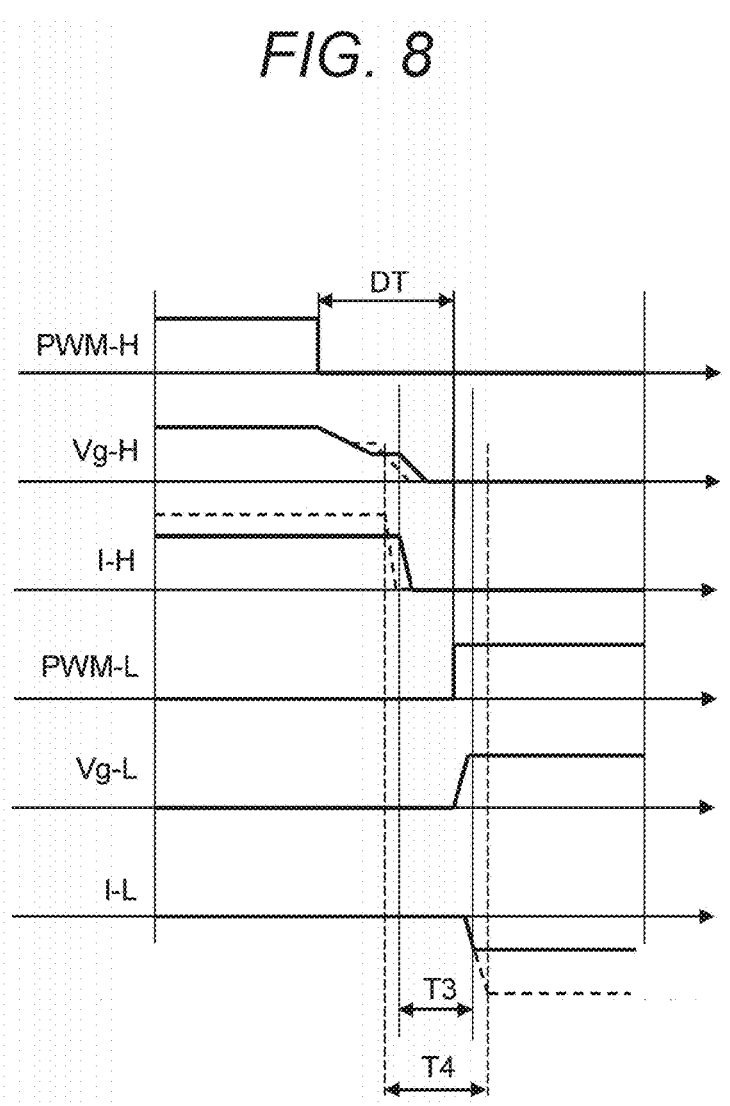
FIG. 8 is a diagram for describing a change in fall time of a gate voltage depending on a magnitude of a current flowing through a switching element.

FIG. 8 is a diagram for describing a change in fall time of a gate voltage depending on the magnitude of the current flowing through the switching elements S1 and S2. Dashed lines in the gate voltage Vg-H and the current I-H on the upper arm side and the current I-L on the lower arm side indicate a case where the current flowing through the element is large. The fall time of the gate voltage Vg-H varies depending on the magnitude of the current flowing through the element. At the same time, the turn-off time of the current I-H also varies. When the current is large, both the fall of the gate voltage and the turn-off time are shortened.

In FIG. 8, T3 is a diode loss period of the diode D2 when the current is small, and T4 is a diode loss period when the current is large. When a constant dead time DT is provided, the diode loss period becomes longer as the current becomes larger. Thus, when trying to optimize the dead time DT in accordance with a large current, there is a high possibility that a vertical short circuit occurs at the time of current conduction smaller than that. Of course, it is possible to control the dead time DT every time with the software on the CPU side according to the magnitude of the current, but it is not realistic because the software processing load and the optimization take a lot of time and effort. In addition, in the configuration described in PTL 1, it is difficult to control the dead time DT with a circuit every time according to the magnitude of the current.

On the other hand, in the present embodiment, synchronous rectification can be performed in the optimum short circuit prevention period DT1 (see FIG. 5) according to the gate state. As a result, the diode loss can be minimized while preventing a vertical short circuit.

(Prevention of Vertical Short Circuit at the Time of Soft Shutdown)

The gate drives IC 10A and 10B have a function called soft turn-off or soft shutdown as a protective function at the time of overcurrent detection. In the soft shutdown, the falling speed of the gate drive signal is reduced to further lengthen the gate-off time so that the switching element is not destroyed by the surge due to gate-off. In the inverter 201 illustrated in FIG. 13, three-phase short-circuit control may be performed as safe operation. When a fault state (overcurrent detection) is notified to the low-voltage side CPU or the safety operation circuit, the three-phase short-circuit control on the other arm side is performed. For example, when an overcurrent is detected in the upper arm, three-phase short-circuit control of the lower arm on the other arm side is performed. When a voltage due to the soft shutdown remains in the upper arm at the time of the three-phase short-circuit control, a vertical short circuit occurs.

However, in the configuration of the present embodiment, since the output signal of the OSFB terminal 105 is input to the INB terminal 102 on the other arm side, the other arm is not turned on as illustrated in FIG. 5 while the gate voltage of the arm remains during the soft shutdown. Thus, even in the above-described case, the occurrence of a vertical short circuit can be prevented.

First Modification

Figure 9:
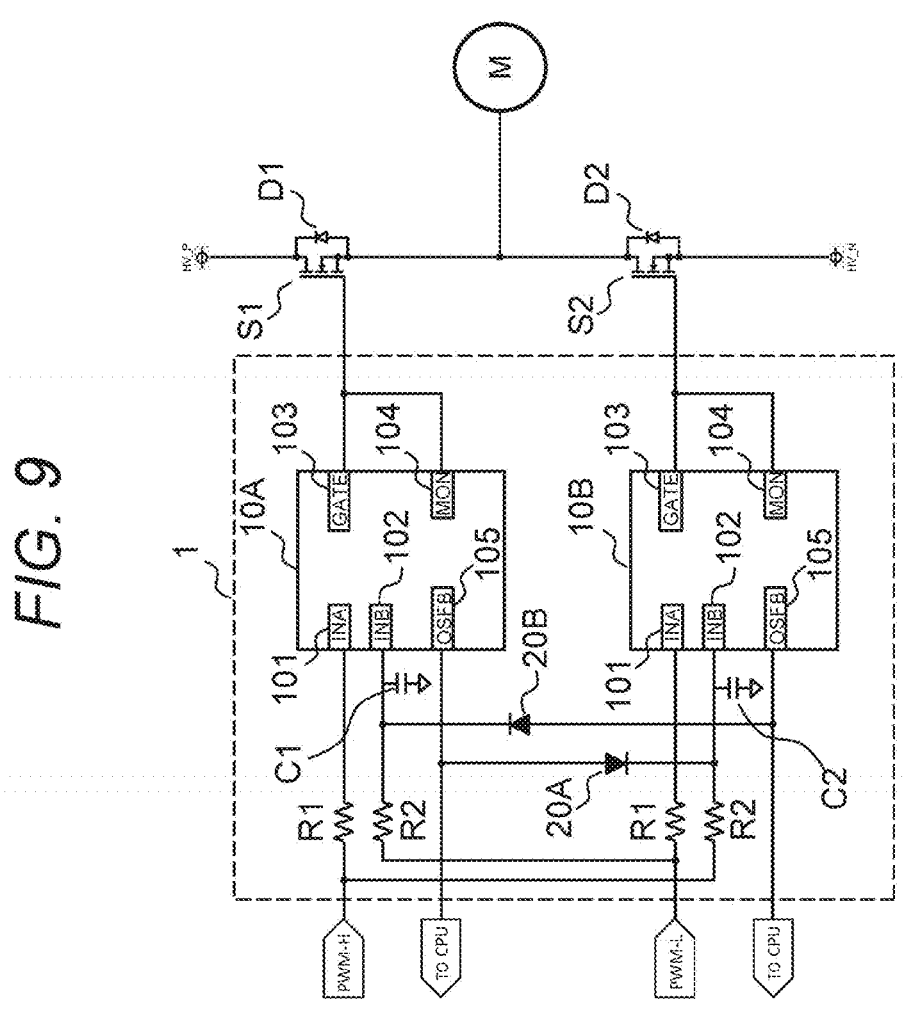
FIG. 9 is a diagram illustrating a first modification.

FIG. 9 is a diagram illustrating a first modification of the above-described embodiment. In the first modification, a capacitor C1 whose one end is grounded is connected between the INB terminal 102 of the gate drive IC 10A and the diode 20B, and a capacitor C2 whose one end is grounded is connected between the INB terminal 102 of the gate drive IC 10B and the diode 20A.

In the case of the first modification, when the gate voltage of the upper arm rises and the output signal of the OSFB terminal 105 of the gate drive IC 10A becomes High, the INB terminal 102 of the gate drive IC 10B of the lower arm becomes High. Thereafter, when the gate of the upper arm is turned off and the OSFB terminal 105 of the gate drive IC 10A becomes Low, the rate of voltage drop at the INB terminal 102 of the gate drive IC 10B can be made slow because of the function of the capacitor C2. As a result, the gate rising of the lower arm can be delayed for a certain period of time. For example, there is a type of gate drive IC in which a mirror clamp (erroneous call prevention function) operates after the gate is turned off. In such a case, providing the capacitors C1 and C2 and delaying the gate ON of the arm as described above makes it possible to gain time until the mirror clamp operation.

Second Modification

Figure 10:
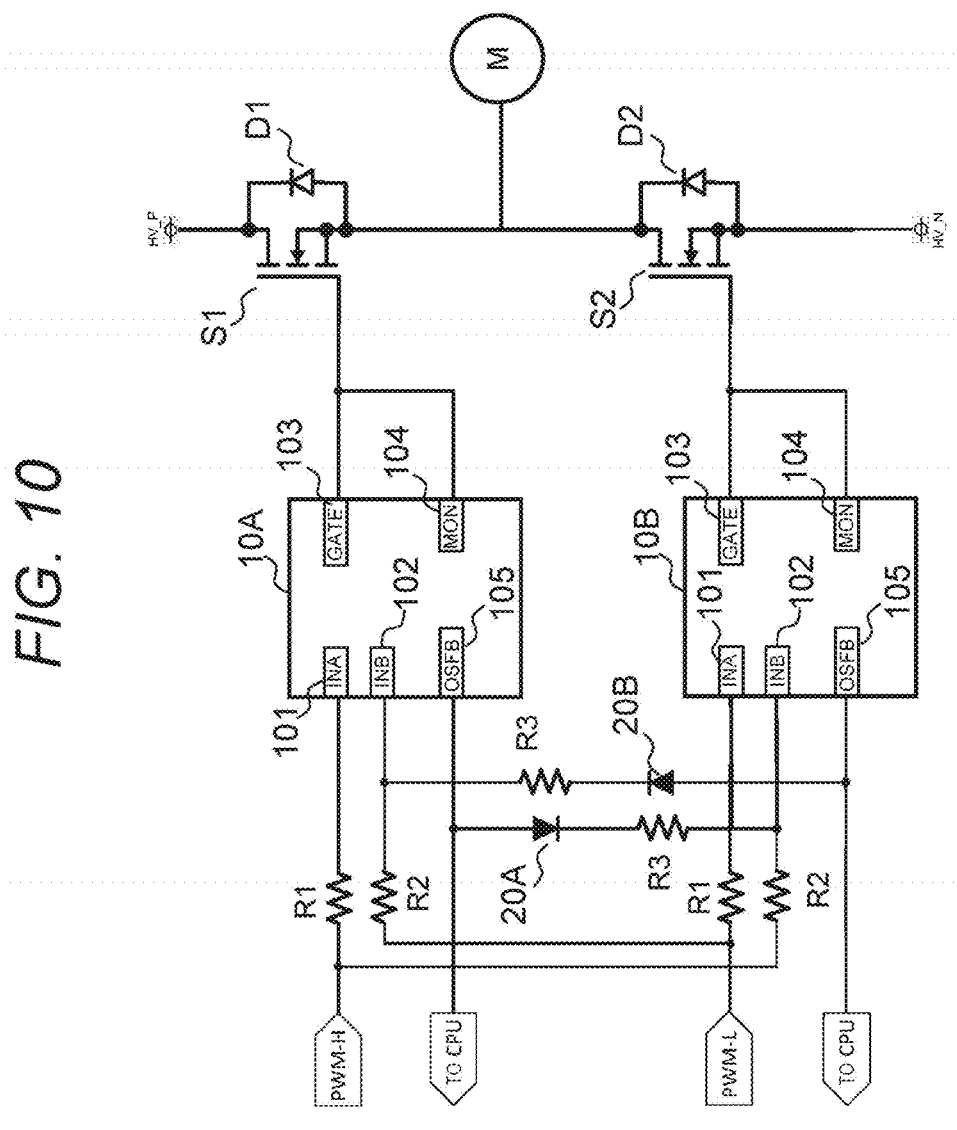
FIG. 10 is a diagram illustrating a second modification.

FIG. 10 is a diagram illustrating a second modification. In FIG. 10, a resistor R3 is further added to the configuration illustrated in FIG. 1. The resistor R3 is provided between the diode 20A and the INB terminal 102 of the gate drive IC 10B, and also between the diode 20B and the INB terminal 102 of the gate drive IC 10A. Other configurations are the same as that of FIG. 1.

Figure 11:
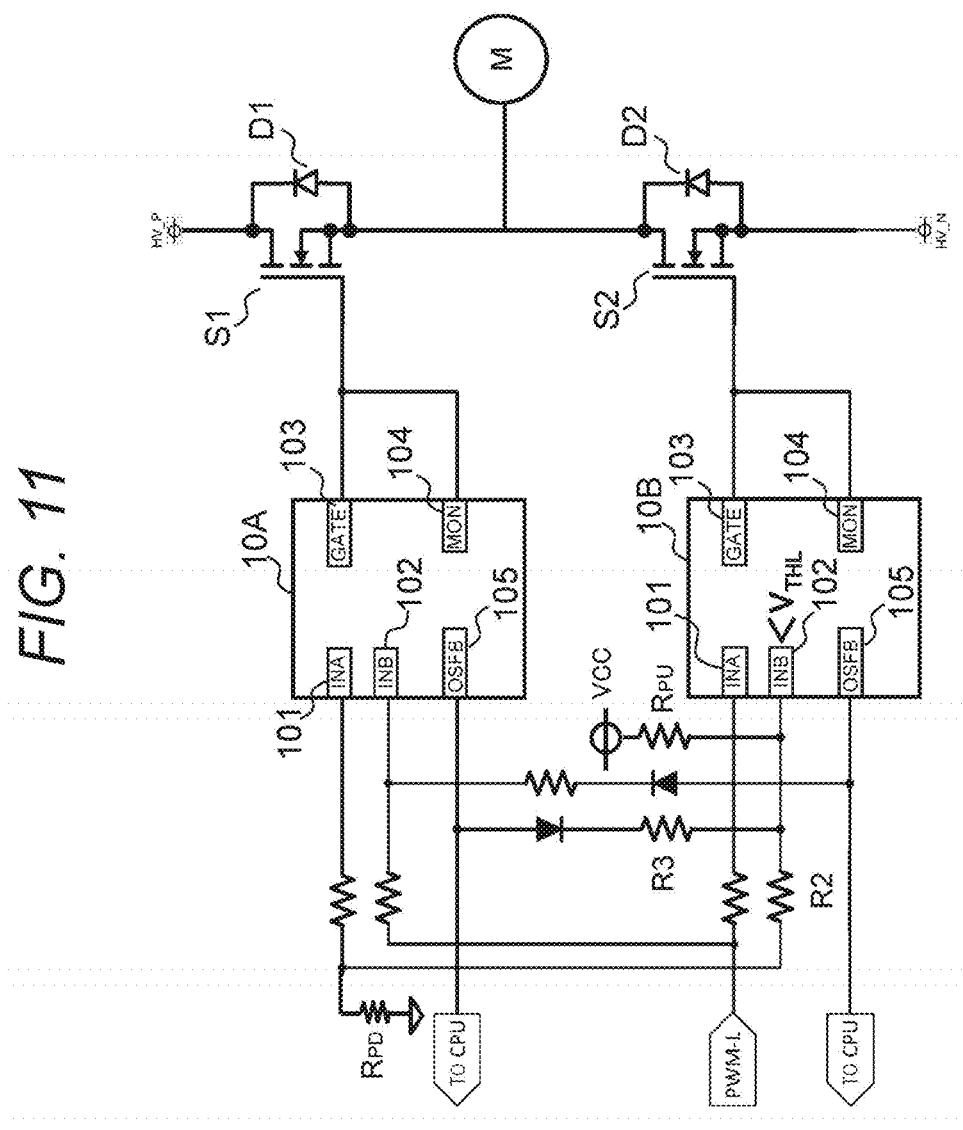
FIG. 11 is a diagram for describing a voltage of an INB terminal at the time of pulldown control.

Normally, the PWM signal is driven to a control voltage (VCC) or 0 V by a push-pull output. As illustrated in FIG. 11, a pull-down resistor RPD is provided in the INA terminal 101 of the gate drive IC so as to be Low even when the gate drive IC is opened. On the other hand, as a logic, the PWM signal is not driven when the INB terminal 102 is High, and thus a pull-up resistor RUP is provided in the INB terminal 102. The resistors RPD and RUP are provided in both the gate drives IC 10A and 10B, but only the resistors RPD and RUP of the gate drive IC 10A are illustrated in FIG. 11.

In the safe operation circuit of the power conversion device, pull-up or pull-down may be performed during safe operation. In the second modification, providing the resistor R3 causes the input signals of the INA terminal 101 and the INB terminal 102 to have consistent values even in such a case.

In FIG. 11, when the control is performed by pull-down, that is, when the PWM-H signal of the upper arm is Low (=0 V), the INB-L signal needs to be lower than a Low threshold value VTHL in order that the INB terminal 102 of the lower arm is also in a Low state. When a current such as a current from RPU through R2 to RPD flows in FIG. 11, in order for the potential of the INB terminal 102 of the gate drive IC 10B to be lower than VTHL, the resistor R2 needs to satisfy the following Formula (1).

$$VCC \times (R2 + RPD)/(R2 + RPD + RPU) < VTHL \qquad (1)$$

$$R2 < (VTHL/(VCC - VTHL)) \times RPU - RPD$$

Figure 12:
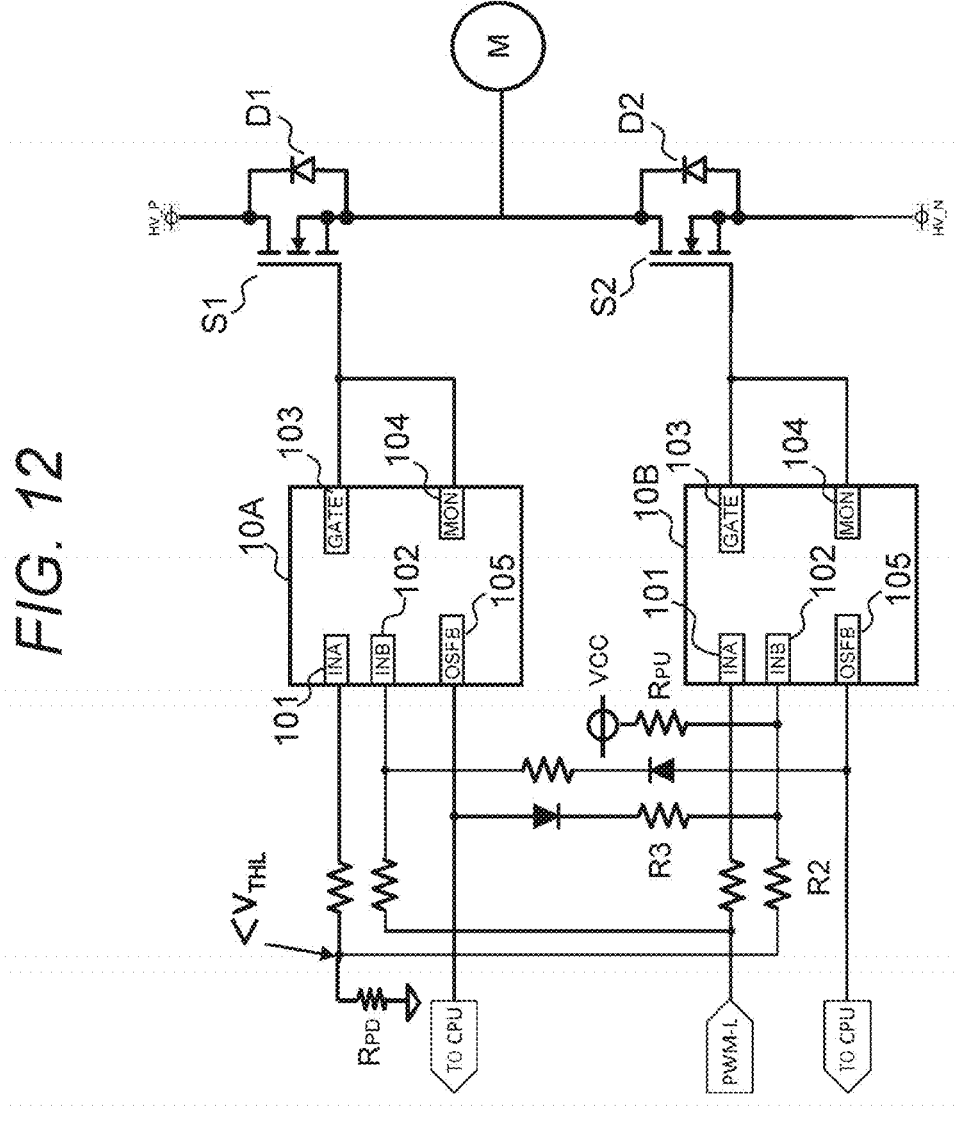
FIG. 12 is a diagram for describing a voltage of an INA terminal at the time of pulldown control.

When the gate voltage Vg-H of the switching element S1 of the upper arm is High, the OSFB terminal 105 of the gate drive IC 10A is in a High (=5 V) state. When pull-down is performed from this state and the PWM-H signal becomes Low (=0 V), the INA-H signal which is the input of the INA terminal 101 needs to be lower than the Low threshold value VTHL (see FIG. 12).

$$VCC \times RPD / (RPD + R2 + R3 \times RPU / (R3 + RPU)) < VTHL \quad (2)$$

$$R2 + R3 \times RPU / (R3 + RPU) > ((VCC - VTHL) / VTHL) \times RPD$$

In the second modification, by further adding the resistor R3 and setting the values of the resistors R2 and R3 to satisfy Formulas (1) and (2), the INB-L signal and the INA-H signal can be made lower than the Low threshold value VTHL.

For example, as a safe operation of the inverter 201 that drives the three-phase alternating-current motor M illustrated in FIG. 13, there is three-phase short-circuit control with a control operation of a safety circuit on the CPU side. When a contactor (not illustrated) that opens and closes the connection between the inverter 201 and the high-voltage battery 300 is released during the rotation of the motor M, the high tension voltage in the inverter 201 increases due to the induced voltage of the motor M. At this time, the three-phase switching elements S1, S3, and S5 of the upper arm or the three-phase switching elements S2, S4, and S6 of the lower arm are turned on to cause a three-phase short circuit. In this case, the safety circuit pulls up the side to be turned on and pulls down the side not to be turned on. As a result, the induced voltage is converted into a current between the three-phase switching element turned on and the motor M, and an increase in the high tension voltage in the inverter 201 can be prevented.

Further, depending on the situation, there is safety control to transition from a three-phase short circuit to a free wheel (FW) in which all arms are turned off. When such safety control is performed, the PWM signal of the arm that has been turned on is set to Low and pulled down. However, in the configuration in which the pull-up resistor RUP is provided at the INB terminal 102 as illustrated in FIG. 11, as described above, the voltage of the INA terminal 101 does not become lower than the Low threshold value VTHL in the configuration of FIG. 1. In the second modification, to avoid such inconvenience, the resistor R3 is provided between the diodes 20A and 20B and each INB terminal 102.

According to the embodiment and the first and second modifications of the present invention described above, the following operational effects are obtained.

(C1) As illustrated in FIG. 1, a gate drive circuit 1 includes a gate drive IC 10A that drives a gate of a switching element S1 of an upper arm, a gate drive IC 10B that drives a gate of a switching element S2 of a lower arm connected in series to the switching element S1, two resistors R1, two resistors R2, and diodes 20A and 20B. Each of the gate drives IC 10A and 10B includes an INA terminal 101 and an INB terminal 102 to which a PWM signal is input, a gate output terminal 103 that outputs a gate drive signal, and an OSFB terminal 105 that outputs a feedback signal of the gate drive signal, and is configured to output a gate drive signal in an ON state when the PWM signal of the INA terminal 101 is ON and the PWM signal of the INB terminal 102 is OFF. In the gate drive IC 10A, as the PWM signal, a PWM-H signal for the switching element S1 is input to the INA terminal 101 via the resistor R1, and a PWM-L signal for the switching element S2 is input to the INB terminal 102 via the resistor R2. In the gate drive IC 10B, as the PWM signal, a PWM-L signal is input to the INA terminal 101 via the resistor R1, and the PWM-H signal is input to the INB terminal 102 via the resistor R2. The diode 20A includes a cathode side connected to the INB terminal 102 of the gate drive IC 10B, and an anode side connected to the OSFB terminal 105 of the gate drive IC 10A. The diode 20B includes a cathode side connected to the INB terminal 102 of the gate drive IC 10A, and an anode side connected to the OSFB terminal 105 of the gate drive IC 10B.

As illustrated in FIG. 1, the output signal of the OSFB terminal 105 of the gate drive IC 10A of the upper arm is input to the INB terminal 102 of the gate drive IC 10B on the other arm side, and the output signal of the OSFB terminal 105 of the gate drive IC 10B of the lower arm is input to the INB terminal 102 of the gate drive IC 10A on the other arm side. This makes it possible to suppress the gate drive on the other arm side of either arm in the middle of gate-off, and it is possible to prevent a vertical short circuit even when the dead time DT set by the PWM signal is insufficient.

In addition, as illustrated in FIG. 1, providing the diodes 20A and 20B makes it possible to prevent Low of the OSFB-L signal from inhibiting the INB terminal 102 of the gate drive IC 10A from becoming High in a situation where the OSFB-L signal of the gate drive IC 10B is Low and the PWM-L signal input to the INB terminal 102 of the gate drive IC 10A is High. In addition, providing the resistors R1 and R2 as illustrated in FIG. 1 makes it possible to avoid a situation in which High of the OSFB-H signal and Low of the PWM-H signal compete with each other and the INA terminal 101 of the gate drive IC 10A does not become Low.

(C2) In (C1) described above, as illustrated in FIG. 10, a resistor R3 connected in series with the diodes 20A and 20B is further provided. Providing the resistor R3 in this manner makes it possible to control the INB-L signal and the INA-H signal to be lower than the Low threshold value VTHL as described with reference to FIGS. 10 to 12, even in a case where the pull-down control is performed during safe operation.

(C3) In (C1) described above, a field effect transistor is used for the switching elements S1 and S2 illustrated in FIG. 1. In the case of a MOSFET (including SiC), a GaN high electron mobility transistor (HEMT), or the like, since there is reverse conductivity at the time of gate ON, it is possible to perform synchronous rectification by performing ON controlling on the switching element S2 during reflux. As illustrated in FIGS. 3 to 7, in the present embodiment, synchronous rectification can be performed in the optimum short circuit prevention period DT1 according to the gate state. As a result, the diode loss can be minimized while preventing a vertical short circuit.

(C4) In (C3) described above, the field effect transistor is a field effect transistor using silicon carbide or gallium nitride. In the field effect transistor using these materials, the forward voltage Vf of the parasitic body diode is high. Thus, there is a feature that a loss reduction effect because of synchronous rectification is larger.

(C5) In (C1) described above, the gate drives IC 10A and 10B have a soft shutdown function that slows down the falling speed of the gate drive signal and makes the gate-off time longer. In the embodiment described above, as illustrated in FIG. 1, since the output signal of the OSFB terminal 105 is input to the INB terminal 102 on the other arm side, the other arm is not turned on as illustrated in FIG. 5 while the gate voltage of the arm remains during the soft shutdown. Thus, even when a gate drive IC having a soft shutdown function is used, it is possible to prevent occurrence of a vertical short circuit at the time of soft shutdown.

(C6) In (C1) described above, as illustrated in FIG. 9, a capacitor element C1 whose one end is grounded is connected between the INB terminal 102 of the gate drive IC 10A and the diode 20B. In the same manner, a capacitor element C2 whose one end is grounded is connected between the INB terminal 102 of the gate drive IC 10B and the diode 20A. For example, when the gate of the upper arm in FIG. 9 is turned off and the OSFB terminal 105 of the gate drive IC 10A becomes Low, the rate of voltage drop at the INB terminal 102 of the gate drive IC 10B can be made slow because of the function of the capacitor C2. As a result, the gate rising of the lower arm can be delayed for a certain period of time.

(C7) As illustrated in FIGS. 1 and 13, a power conversion device includes the gate drive circuit 1 (203) according to any one of (C1) to (C6), a switching element S1 driven by the gate drive signal output from the gate drive IC 10A, a switching element S2 driven by the gate drive signal output from the gate drive IC 10B, and a control circuit 202 that outputs a PWM-H signal to the gate drive IC 10A and outputs the PWM-L signal to the gate drive IC 10B.

As illustrated in FIG. 1, the gate drive IC provided in the gate drive circuit 203 inputs an output signal of the OSFB terminal 105 to the INB terminal 102 on the other arm side. In the three-phase short-circuit control at the time of soft shutdown, the other arm is not turned on as illustrated in FIG. 5 while the gate voltage of an arm remains during the soft shutdown, which can prevent the occurrence of a vertical short circuit.

In the embodiment described above, the power conversion device 200 illustrated in FIG. 13 is described as an application example of the gate drive circuit 1, but the present invention can be applied to various power conversion devices such as a DC-DC converter.

The embodiments and various modifications described above are merely examples, and the present invention is not limited to these contents as long as the characteristics of the invention are not impaired. Although various embodiments and modifications have been described above, the present invention is not limited to these contents. Other aspects conceivable within the scope of the technical idea of the present invention are also included within the scope of the present invention.

REFERENCE SIGNS LIST 1 gate drive circuit
10A, 10B gate drive IC
101 INA terminal
102 INB terminal
103 gate output terminal
104 gate monitor terminal
105 gate state feedback terminal (OSFB terminal)
200 power conversion device
201 inverter
202 control circuit
203 gate drive circuit
C1, C2 capacitor
D1, D2 diode
M motor
S1 to S6 switching element

The invention claimed is:

1. A gate drive circuit comprising:
a first gate drive IC that drives a gate of a first switching element of an upper arm;

a second gate drive IC that drives a gate of a second switching element of a lower arm connected in series to the first switching element;
first, second, third, and fourth resistance elements; and
first and second diodes,
wherein
each of the first and second gate drives IC includes:
an INA terminal and an INB terminal to which a PWM signal is input;
a gate output terminal that outputs a gate drive signal; and
an OSFB terminal that outputs a feedback signal of the gate drive signal,
each of the first and second gate drives IC is configured to output a gate drive signal in an ON state when the PWM signal of the INA terminal is ON and the PWM signal of the INB terminal is OFF,
in the first gate drive IC, as the PWM signal, a first PWM signal for the first switching element is input to the INA terminal via the first resistance element, and a second PWM signal for the second switching element is input to the INB terminal via the second resistance element,
in the second gate drive IC, as the PWM signal, the second PWM signal is input to the INA terminal via the third resistance element, and the first PWM signal is input to the INB terminal via the fourth resistance element,
the first diode includes a cathode side connected to the INB terminal of the second gate drive IC and an anode side connected to the OSFB terminal of the first gate drive IC, and
the second diode includes a cathode side connected to the INB terminal of the first gate drive IC and an anode side connected to the OSFB terminal of the second gate drive IC.

2. The gate drive circuit according to claim 1, the gate drive circuit further comprising:
a fifth resistance element connected in series with the first diode; and
a sixth resistance element connected in series with the second diode.

3. The gate drive circuit according to claim 1, wherein a field effect transistor is used for the first and second switching elements.

4. The gate drive circuit according to claim 3, wherein the field effect transistor is a field effect transistor using silicon carbide or gallium nitride.

5. The gate drive circuit according to claim 1, wherein the first and second gate drives IC have a soft shutdown function of slowing down a falling speed of the gate drive signal and making a gate-off time longer.

6. The gate drive circuit according to claim 1, wherein a first capacitor element whose one end is grounded is connected between the INB terminal of the first gate drive IC and the second diode, and
a second capacitor element whose one end is grounded is connected between the INB terminal of the second gate drive IC and the first diode.

7. A power conversion device comprising:
the gate drive circuit according to claim 1;
the first switching element driven by a gate drive signal output from the first gate drive IC;
the second switching element driven by a gate drive signal output from the second gate drive IC; and
a control circuit that outputs the first PWM signal to the first gate drive IC and outputs the second PWM signal to the second gate drive IC.

* * * * *